United States Patent
Mylaraswamy et al.

(10) Patent No.: US 9,507,982 B2
(45) Date of Patent: Nov. 29, 2016

(54) LINE REPLACEABLE UNIT HEALTH NODES AND METHODS FOR DETERMINING MAINTENANCE ACTIONS RELATING TO LINE REPLACEABLE UNITS

(71) Applicant: HONEYWELL INTERNATIONAL INC., Morristown, NJ (US)

(72) Inventors: Dinkar Mylaraswamy, Fridley, MN (US); George T. Woessner, Phoenix, AZ (US); Patrick Gonia, Maplewood, MN (US); Ronald Pardini, Chandler, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 14/590,333

(22) Filed: Jan. 6, 2015

(65) Prior Publication Data
US 2016/0196457 A1    Jul. 7, 2016

(51) Int. Cl.
*G06K 7/10* (2006.01)
*B64F 5/00* (2006.01)
*H04W 4/00* (2009.01)

(52) U.S. Cl.
CPC ......... *G06K 7/10366* (2013.01); *B64F 5/0045* (2013.01); *H04W 4/008* (2013.01)

(58) Field of Classification Search
CPC .................... G06K 7/10366; G06K 7/10009; G06K 19/0723; G06K 7/10316; G06K 7/10356; G06K 7/0008; G06K 7/10297
USPC ........................................................ 340/10.1
See application file for complete search history.

(56) References Cited

U.S. PATENT DOCUMENTS

| | | | |
|---|---|---|---|
| 7,719,416 B2 | 5/2010 | Arms et al. | |
| 8,011,255 B2 | 9/2011 | Arms et al. | |
| 8,229,622 B2 * | 7/2012 | Payne | B64F 5/0045 701/33.4 |

(Continued)

OTHER PUBLICATIONS

S.G. Burrow et al. "Wireless sensors and energy harvesting for rotary wing aircraft Health and Usage Monitoring Systems," 2008, In Proc. Nanopower Forum, Costa Mesa, CA.

(Continued)

*Primary Examiner* — Mark Blouin
(74) *Attorney, Agent, or Firm* — Lorenz & Kopf, LLP

(57) ABSTRACT

Line Replaceable Unit (LRU) health nodes are provided, as are methods for determining maintenance actions with respect to LRU health nodes. In one embodiment, the LRU health node includes a passive Radio Frequency identification (RFID) module having an RFID memory and an RFID antenna coupled thereto. The LRU health node further includes a mass storage memory, a sensor configured to monitor an operational parameter of an LRU and generate a corresponding output signal, and a health node controller operably coupled to the passive RFID module, to the mass storage memory, and to the sensor. The health node controller is configured to: (i) record the output signal generated by the sensor in the mass storage memory as time-phased sensor data, (ii) derive health summary data from the time-phased sensor data, and (iii) store the health summary data in the RFID memory.

20 Claims, 3 Drawing Sheets

(56) References Cited

U.S. PATENT DOCUMENTS

| | | | | |
|---|---|---|---|---|
| 8,615,374 B1* | 12/2013 | Discenzo | ............... | G01D 21/02 219/497 |
| 2007/0112608 A1* | 5/2007 | Avery | .................... | G06Q 10/06 705/305 |
| 2009/0128294 A1 | 5/2009 | Kim et al. | | |
| 2009/0314002 A1* | 12/2009 | Libera | ....................... | F02C 6/08 60/778 |
| 2011/0270482 A1* | 11/2011 | Holzer | ............... | G05B 19/4184 701/31.4 |
| 2012/0128294 A1* | 5/2012 | Voss | .................... | G02B 6/3504 385/16 |
| 2012/0143436 A1* | 6/2012 | Cornet | .................. | G07C 5/085 701/33.4 |
| 2012/0266606 A1 | 10/2012 | Zeiner et al. | | |
| 2012/0319823 A1* | 12/2012 | Butler | .................. | G06K 7/0008 340/10.1 |
| 2013/0335197 A1* | 12/2013 | Oder | .................... | G06K 7/0008 340/10.1 |
| 2014/0282727 A1* | 9/2014 | Keen | .................. | H04N 21/4222 725/37 |
| 2016/0071331 A1* | 3/2016 | Angus | .................. | G07C 5/0808 701/29.1 |
| 2016/0092192 A1* | 3/2016 | Frayssignes | .............. | G06F 8/61 717/174 |

OTHER PUBLICATIONS

S.W. Arms et al. "Energy Harvesting, Wireless, Structural Health Monitoring and Reporting Systems," 2008, Lord MicroStrain published papers.

Extended EP Search Report for Application No. 16150098.8-1953 dated Jun. 23, 2016.

* cited by examiner

LINE REPLACEABLE UNIT HEALTH NODES AND METHODS FOR DETERMINING MAINTENANCE ACTIONS RELATING TO LINE REPLACEABLE UNITS

TECHNICAL FIELD

The present invention relates generally to avionic prognostic and health management systems and, more particularly, to health nodes for deployment on line replaceable units, as well as to methods for determining maintenance actions relating to line replaceable units.

BACKGROUND

Unplanned maintenance events can delay and possibly result in the cancellation of aircraft takeoff, which may increase operating cost and complexity, as well as negatively impact on-time delivery and overall customer satisfaction. An unplanned maintenance event can occur when an aircraft engine fails to start or responds sluggishly during Main Engine Start (MES). In this event, maintenance personnel may be dispatched to the aircraft to quickly determine if proper engine operation can be restored by replacing a Line Replaceable Unit (LRU) involved in the MES procedure. In the case of an air-started engine, the maintenance personnel may inspect any LRUs supporting MES, such as a starter air valve and an air turbine starter, for signs of oil leakage or other visual evidence of a fault. If the maintenance personnel determine that a particular LRU is likely at fault, the technician may perform an infield replacement of the LRU and MES may be reattempted.

To reduce the occurrence of unplanned maintenance events, aircraft engine are commonly subject to routine inspection at predetermined operating hour intervals. Routine inspection may entail an evaluation of the current condition or "health" of the LRUs installed on the engine. In this manner, an LRU can be replaced preemptively if the health of the LRU is questionable or if its serviceable lifespan is soon to expire. While this is advantageous, routine inspection practices remain limited in several respects. For example, by conventional practice, LRU health is typically inferred from data stored in a memory module associated with the engine controller. Consequently, it may be necessary to power-up the aircraft engine to access the data stored on the memory module and thereby inferentially determine LRU health. Not only does this add undesired time, cost, and complexity to the inspection process, but each engine start-up contributes to engine component wear. Furthermore, engine start often results in the generation of a number of unrelated messages, which can introduce confusion and further complicate the otherwise basic task of evaluating LRU health. Finally, the limited information stored the engine controller memory module often provides an incomplete picture of overall LRU health.

BRIEF SUMMARY

Line Replaceable Unit (LRU) health nodes are provided. In one embodiment, the LRU health node includes a passive Radio Frequency identification (RFID) module having an RFID memory and an RFID antenna coupled thereto. The LRU health node further includes a mass storage memory, a sensor configured to monitor an operational parameter of an LRU and generate a corresponding output signal, and a controller operably coupled to the passive RFID module, to the mass storage memory, and to the sensor. The controller is configured to: (i) record the output signal generated by the sensor in the mass storage memory as time-phased sensor data, (ii) derive health summary data from the time-phased sensor data, and (iii) store the health summary data in the RFID memory. In certain cases, the controller can also store additional information useful for maintenance purposes. Such addition information can include bills of material, serial numbers, nameplate data, and other such information facilitating maintenance depot planning, inventory, and asset management operations.

Embodiments of a LRU health node system are further provided. In one embodiment, the LRU heath node system includes a first LRU containing a rotating component, such as a Starter Air Valve containing a rotatable valve or an Air Turbine Starter containing an air turbine. An LRU health node is mounted to the first LRU and includes an RFID module containing an RFID memory. The LRU health node further includes an RFID module containing an RFID memory, a first sensor configured to monitor an operational parameter pertaining to the rotating component and generate a corresponding output signal, and a health node controller operably coupled to the RFID module and to the first sensor. The health node controller is configured to derive health summary data from the output signal generated by the sensor and store the health summary data in the RFID memory for subsequent access utilizing a wireless RFID scanner.

The LRU health further includes a mass storage memory, a first sensor configured to monitor an operational parameter pertaining to the rotating component and generate a corresponding output signal, and a health node controller operably coupled to the RFID module, to the mass storage memory, and to the first sensor. The health node controller is configured to: (i) record the output signal generated by the sensor in the mass storage memory as time-phased sensor data, (ii) derive health summary data from the time-phased sensor data, and (iii) store the health summary data in the RFID memory.

Embodiments of a method for determining maintenance actions relating to LRUs are still further provided. In one embodiment, the method includes the steps or processes of transmitting an interrogation signal from an RFID scanner to an RFID module included within an LRU health node installed on the LRU. In response to transmission of the interrogation signal, the RFID scanner receives health summary data stored in an RFID memory of the RFID module and pertaining to the LRU. The RFID scanner determines a maintenance action as a function of the health summary data, possibly by forwarding the data over a digital network to a remotely-located maintenance support center as part of a cloud- or web-based service. The maintenance action is then displayed on a screen of the RFID scanner for presentation to maintenance personnel.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
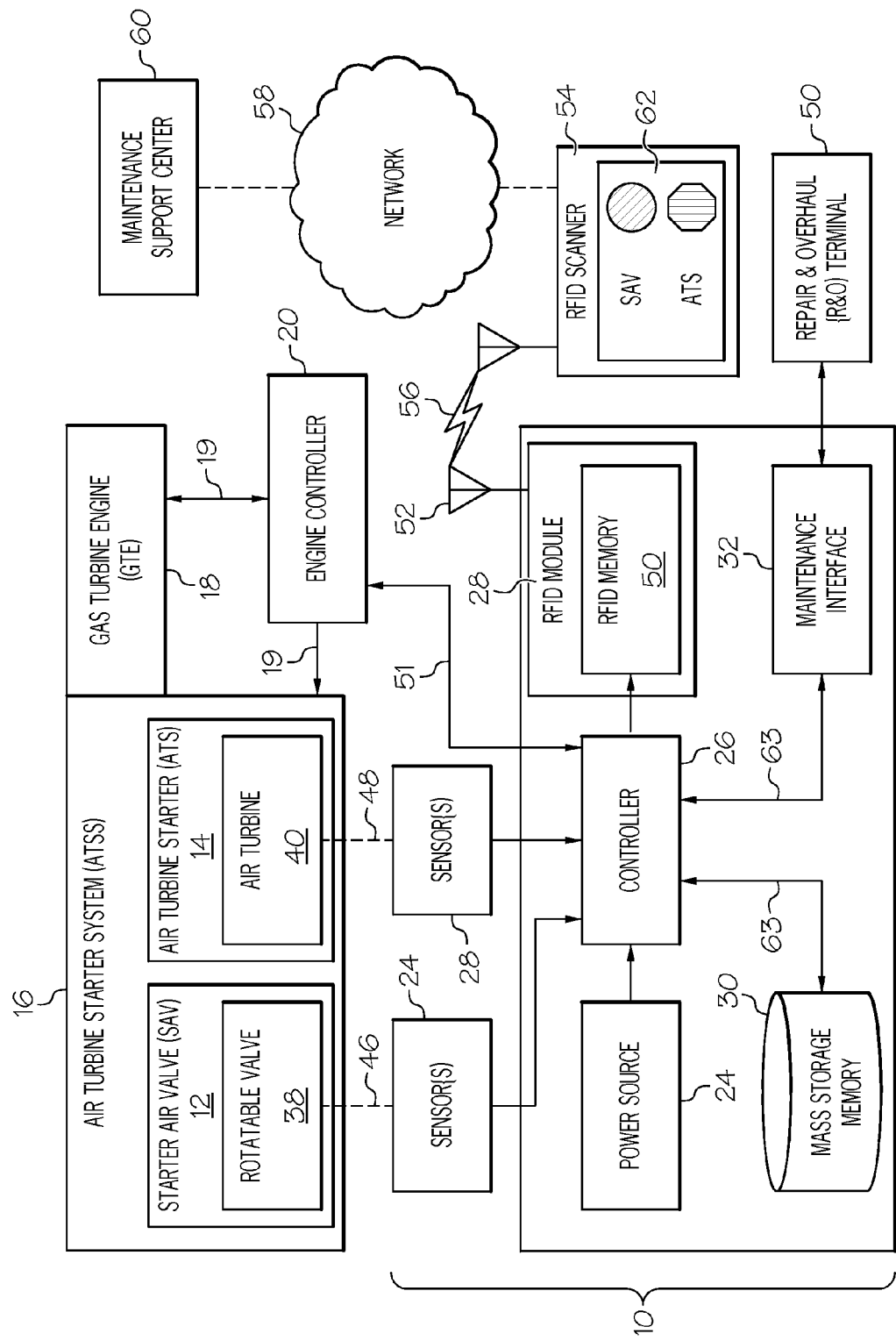
FIG. 1 is a schematic of a Line Replaceable Unit (LRU) health node, a first LRU (e.g., a starter air valve) monitored by the health node, a second LRU (e.g., an air turbine starter) further monitored by the health node, and additional infrastructure suitable for usage in conjunction with the LRU health node, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

The following describes embodiments of discrete data recording devices or "health nodes," which are utilized in gathering data relating to the condition or health of Line Replaceable Units (LRUs). In preferred embodiments, the LRU health nodes can be retrofit onto existing LRUs, which may otherwise lack processing and memory storage capabilities. The LRU health nodes can thus be installed on or utilized in conjunction with any number of selected LRUs to effectively introduce intelligence or awareness to the selected LRUs for prognostic and health management purposes. From a marketing standpoint, this permits the LRU health node to be offered commercially as an optional "add-on" feature thereby allowing the customer the flexibility of purchasing the LRU with or without the health node. In certain implementations, the LRU health node can be self-contained and may have power harvesting capabilities. Additionally or alternatively, the LRU health node may receive power from an available power line associated with the LRU. The LRU health nodes can be utilized in conjunction with various different types of LRUs including, but not limited to, heat exchangers, oil pumps, fuel pumps, cooling fans, Starter Air Valves (SAVs), Air Turbine Starters (ATSs), fuel flow divider valves, and ecology valve systems. Embodiments of the LRU health nodes are well-suited for usage in monitoring LRUs employed during MES of an air-started engine including, but not limited to SAVs and ATSs. For this reason, the following description will focus primarily on an exemplary embodiment of an LRU health node utilized to monitor the operational parameters of an SAV and an ATS. The following example notwithstanding, it is emphasized that embodiments of the below-described LRU health node can be utilized in conjunction with various other types LRUs, which are desirably monitored for health diagnostic purposes and regardless of whether the LRU is supportive of MES.

As described more fully below, it is a primary purpose of the LRU health node to store data useful in rapidly and accurately evaluating LRU health. In preferred embodiments, the LRU health node stores two general categories or types of data: (i) sensor data accumulated over the operational lifespan of one or more LRUs (referred to herein as the "time-phased sensor data"), and (ii) condensed health summary data derived from the time-phased sensor data. Relative to the time-phased sensor data, the health summary data constitutes a relatively small set of data points that collectively provide a summation or aggregation of the time-phased sensor data. The time-phased sensor data and the health summary data are advantageously stored in physically separate memories. Specifically, the time-phased sensor data can be stored in a large capacity memory, which is accessible utilizing a physical interface on the health node; while the health summary data is stored in a small capacity memory, which is accessible via a wireless receiver and preferably via an radiofrequency antenna included within a Radio Frequency Identification (RFID) module. The large capacity memory is referred to herein as a "mass storage memory" with the understanding that the term "mass storage" is utilized strictly in a comparative sense to indicate that the mass storage memory has a greater capacity than does the small capacity memory. In one embodiment, the mass storage memory is realized as flash memory. The small capacity memory, by comparison, is referred to herein as the "RFID memory" in embodiments wherein the small capacity memory is contained within the RFID module. In addition to the health summary data, the small capacity or RFID memory can also store other data useful for maintenance purposes, such as bills of material, serial numbers, nameplate data, and other such information facilitating maintenance depot planning, inventory, and asset management operations.

The RFID module is preferably passive by design and, thus, utilizes the energy obtained from an interrogation signal to transmit the health summary data to the RFID scanner, along with information identifying the LRU or LRUs to which the data pertains. In this manner, a technician or other maintenance personnel member can utilize the RFID scanner to quickly interrogate the LRUs installed on a particular GTE without requiring engine start. The previously-described limitations associated with conventional routine inspection processes are overcome as a result. Furthermore, due to its modest file size, the health summary data (and any additional maintenance data) can typically be transmitted to an RFID scanner in a relatively short time period on the order of, for example, one second. This allows a number of LRU health nodes to be scanned by technician to obtain a quick and accurate evaluation of LRU health during an unplanned maintenance event, during routine maintenance, or under other circumstances. After interrogating each LRU health node, the RFID scanner may provide the technician with an intuitive top-level read-out indicating an appropriate maintenance action for each LRU. The top-level read-out can be, for example, a color coded symbol (e.g., a green, yellow, or red icon) indicating whether the LRU should pass inspection, the LRU should be monitored more closely (e.g., due to the upcoming expiration of the LRU serviceable lifespan), or the LRU should be replaced. An example of this process is described in more detail below in conjunction with FIG. 4. First, however, an exemplary embodiment of an LRU health node is described below in conjunction with FIGS. 1-3.

Figure 2:
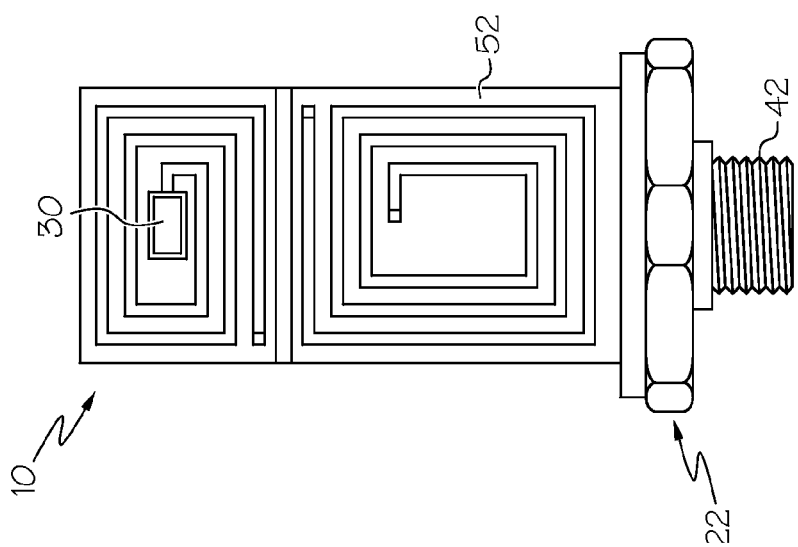

FIG. 1 is a schematic of an LRU health node 10, as illustrated in accordance with an exemplary embodiment of the present invention. In the illustrated example, LRU health node 10 is utilized to monitor the operational parameters of two different LRUs, namely, an SAV 12 and an ATS 14. In further embodiments, LRU health node 10 may exclusively monitor the operational parameters of a single LRU, such as SAV 12, ATS 14, or a different LRU. If desired, a separate and discrete LRU health node can be installed on each LRU desirably monitored for health diagnostic purposes. Together, SAV 12 and ATS 14 form an Air Turbine Starter System (ATSS) 16, which supports MES of a Gas Turbine Engine (GTE) 18. As further indicated in FIG. 1 by control lines 19, the operation of SAV 12, ATS 14, and GTE 18 is generally controlled by an engine controller 20. Engine controller 20 can be, for example, a Full Authority Digital Engine Controller (FADEC). Health node 10 and the LRU(s)

monitored thereby (e.g., SAV 12 and ATS 14 in the illustrated example) are also collectively referred to herein as a "LRU health node system."

In the exemplary embodiment illustrated in FIG. 1, LRU health node 10 includes a main node housing 22, a power source 24, a health node controller 26, an RFID module 28, a mass storage memory 30, and a physical maintenance interface 32. Additionally, LRU health node 10 includes a first sensor 34 (or group of sensors), which monitors one or more operational parameters pertaining to SAV 12; and a second sensor 36 (or group of sensors), which monitors one or more operational parameters pertaining to ATS 14. Main node housing 22 may contain power source 24, health node controller 26, RFID module 28, and mass storage memory 30; while physical maintenance interface 32 may integrated into a wall of housing 22 and accessible from the exterior thereof. Sensors 34 and 36 may or may not be contained within main node housing 22. For example, as indicated in FIG. 1, sensors 34 and 36 can be located remotely from main node housing 22 and operably coupled to health node controller 26 by, for example, a wired connection. More specifically, sensor 34 may be installed on SAV 12 at a location suitable for directly or indirectly monitoring the rotational position of a rotatable SAV valve 38 (e.g., a butterfly valve plate) included within SAV 12. Similarly, sensor 36 may be installed on ATS 14 at a location suitable for directly or indirectly monitoring the rotational speed of an air turbine 40 contained within ATS 14. In certain embodiments, the sensor or sensors included within LRU health node 10 (or node 10 itself) may be positioned at a remote location to help reduce exposure to high temperatures and other harsh environmental conditions.

Figure 3:
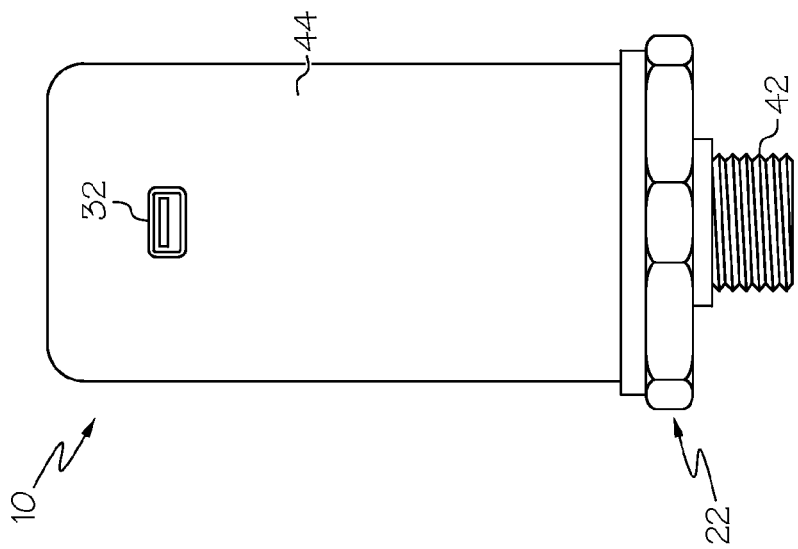
FIGS. 2 and 3 are isometric views illustrating an exemplary manner in which the LRU health node shown in FIG. 1 can be physically implemented.

Main node housing 22 of LRU health node 10 can be positioned at any location enabling data connections to sensors 34 and 36 and will often be physically mounted to or installed within either SAV 12 or ATS 14. In a preferred embodiment, main node housing 22 is mounted to SAV 12 or to ATS 14 in a manner that permits retrofit installation of health node 10, while also providing a structurally robust mounting capable of withstanding a high vibratory avionic environment. A threaded interface can be utilized for this purpose. This may be more fully appreciated by referring briefly to FIGS. 2 and 3, which illustrate one manner in which LRU health node 10 can be physically implemented (sensors 34 and 36 not shown). As can be seen, main node housing 22 is produced to include a threaded extension or plug 42. When LRU health node 10 is installed on SAV 12 or ATS 14, threaded plug 42 may be matingly engage a corresponding female threaded port provided in SAV 12 or ATS 14. Additionally, as shown in FIG. 3, main node housing 22 may further include a cover or casing 44 for structural protection and/or to help thermally insulate the components of LRU health node 10 from the relatively high operational high temperatures to which SAV 12 or ATS 14 are exposed, which may approach or exceed 200° Celsius in certain cases. In other embodiments, node 10 can be positioned at a location providing ease-of-access for scanning and downloading purposes, as described more fully below.

Power source 24 supplies power to health node controller 26 during operation of LRU health node 10. In certain embodiments, power source 24 can be a physical connection to a power line or voltage source available to LRU health node 10 when installed on SAV 12, ATS 14, or another LRU. In other embodiments wherein a power line connection is not available, power source 24 can include a power storage device and one or more energy harvesting mechanisms. Suitable energy harvesting mechanisms include, but are not limited to vibration-based, magnetic pickup, and differential temperature-based energy harvesting mechanisms. As a specific example, power source 24 may include a monopole-based energy harvesting device or other harvesting device capable of generating electricity from a rotating LRU component, such as air turbine 40 of ATS 14. The power storage device included within power source 24 can be, for example, a rechargeable chemistry battery. Alternatively, in embodiments wherein LRU health node 10 records data over relatively short time periods on the order of, for example, 10-30 seconds, a super capacitor can be used for temporary energy storage. In still further embodiments, power source 24 can include one or more energy harvesting mechanisms, while lacking a power storage device. In such embodiments, health node 10 may only operate (or, more accurately, store data in memories) when the monitored LRU or LRUs are functioning and power is harvested therefrom; or upon occurrence of a predetermined trigger event of the type described below.

The sensor or sensors included within LRU health node 10 will vary in conjunction with the particular type of LRU or LRUs monitored by health node 10. In the illustrated example wherein LRU health node 10 monitors one or more operational parameters pertaining to SAV 12, sensor 36 can be a position or displacement sensor that directly or indirectly monitors the rotational position of rotatable SAV valve 38, as indicated in FIG. 1 by dashed line 46. In one embodiment, sensor 36 is a Rotatory Variable Differential Transformer (RVDT), which monitors the position of a shaft to which SAV valve 38 is fixedly coupled. In other embodiments wherein valve position is dictated by the translational position of a hydraulic or pneumatic piston, sensor 36 may be a Linear Variable Differential Transformer (LVDT) that monitors piston position, which can then be converted to the rotational position of SAV valve 38. By comparison, in the case of ATS 14, sensor 36 can be utilized to directly or indirectly monitor the rotational speed of air turbine 40 (indicated in FIG. 1 by dashed line 48). For example, sensor 36 can be one or more monopole pick-ups, which monitor the rotational speed of air turbine 40 directly and/or which monitor the rotational speed of the output shaft of ATS 14. In further embodiments wherein LRU health node 10 monitors an LRU that shares oil with GTE 18, health node 10 can include one or more sensors suitable for measuring oil pressure, oil level, or oil flow rate. A non-exhaustive list of still further sensors that may be included in health node 10 includes vibration sensors, temperature sensors, chemical sensors, wear sensors, and the like.

During operation of LRU health node 10, health node controller 26 receives output signals from sensors 34 and 36 describing the operational parameters of SAV 12 and ATS 14, respectively. Controller 26 contains clock generator or otherwise receives a clock signal from an exterior source, such as engine controller 20. Controller 26 records the signals received from sensors 34 and 36 along with the corresponding date and time information as time-phased sensor data. Collectively, the time-phased sensor data stored makes-up a historical log of LRU activity as accumulated over the operational lifespan of health node 10. As noted above, the time-phased sensor data is stored in mass storage memory 30 and can later be retrieved from memory 30 for failure analysis purposes or for another reason. Mass storage memory 30 can assume any form suitable for storing the time-phased sensor data therein. Mass storage memory 30 can be implemented as a solid state, non-volatile memory, such as flash memory. In one embodiment, memory 30 is realized utilizing Electrically Erasable Programmable Read- Only Memory (EEPROM). Although illustrated as a separate block in FIG. 1, mass storage memory 30 may be integrated into health node controller 26 in certain embodiments. The time-phased sensor data stored in memory 30 can be accessed utilizing physical maintenance interface 32, which will typically provide a higher data transfer rate than does RFID module 28. Physical maintenance interface 32 can be, for example, a bus-connected port from the exterior of main node housing 22, such as a Universal Serial Bus (USB) or Joint Test Action Group (JTAG) port or connector.

LRU health node 10 can continually monitor and record time-phased sensor data during the time periods over which SAV 12 and ATS 14 are operational and health node 10 is powered. Alternatively, LRU health node 10 can record the time-phased sensor data intermittently in response to occurrence of one or more predetermined trigger events. The trigger events can be, for example, commencement of LRU operation or exceedance of a predetermined operational threshold; e.g., health node controller 26 may write the sensor data from sensor 34 into mass storage memory 30 only when rotatable SAV valve 38 rotates beyond an initial position (e.g., a fully closed position) and/or may write the sensor data from sensor 36 into memory only when the rotational rate of air turbine 40 exceeds a particular speed threshold (e.g., 300-500 revolutions per minute). As a further example, the trigger threshold can be a different excursion event, such as when a monitored temperature exceeds a certain threshold. LRU health node 10 can record the output signals of sensors 34 and 36 into mass storage memory 30 for the duration of the time period over which the a predetermined threshold is exceeded. Alternatively, LRU health node 10 may record the sensor output signals into memory 30 for a relatively brief preset time period (e.g., 20-30 seconds) after occurrence of the trigger event. Health node controller 26 can include any suitable number of individual microprocessors, microcontrollers, digital signal processors, programmed arrays, and other standard components known in the art. Health node controller 26 may include or cooperate with any number of software or firmware programs designed to carry out the various methods, process tasks, calculations, and control functions described herein.

In addition to storing time-phased sensor data in mass storage memory 30, controller 26 further derives health summary data from the time-phased sensor data and stores the health summary data in an RFID-readable memory 50 included in RFID module 28. The health summary data ideally includes a relatively small set of data points (e.g., 1-12 data points), which are indicative of the overall condition or health of SAV 12, ATS 14, or other LRU monitored by health node 10. With respect to SAV 12, specifically, the health summary data can include one or more of the following data points: (i) the current rotational range and position of the SAV valve 38, (ii) the current rate at which SAV valve 38 moves between fully open and closed positions, (iii) the cumulative time spent by SAV valve 38 in either the fully open or fully closed position, (iv) the cumulative number of operative cycles of SAV valve 38, and/or (v) the open or closed dead band of SAV valve 38 (that is, the offset between the excepted and actual position of SAV valve 38 when in the fully closed or opened position). Additionally, as indicated in FIG. 1 by double-headed arrow 51, controller 26 may be operably coupled to engine controller 20 and may receive therefrom data indicative of the commands signals issued by controller 20 to SAV 12. In this case, the health summary data can further include any difference between the actual (detected) position of SAV valve 38 and the position to which SAV valve 38 has been commanded by engine controller 20. With respect to ATS 14, the health summary data can include one or more of the following: (i) the amount of time air turbine 40 operates over a particular rotational speed range, (ii) the cumulative cycle count of ATS 14, and/or (iii) the rotational speed of air turbine 40 as compared to the rotational speed of the ATS outlet shaft (when monitored by sensor 36). Additionally, in embodiments wherein controller 26 receives data from engine controller 20 indicative of the ATS command signals, the health summary may also include the ATS response time; that is, the elapsed time between issuance of the engine controller commands and the response by ATS 14.

RFID module 28 further includes an RFID antenna 52 (FIG. 1), which enables wireless communication with compatible RF scanners, preferably over an Ultra High Frequency (UHF) bandwidth. One such RF scanner 54 is schematically shown in FIG. 1 and described more fully below. The term "RFID scanner," as appearing herein, encompasses dedicated handheld devices, RFID-compatible smart phones, RFID-enabled tablet and laptop computers, and any other device capable of wirelessly receiving data from an RFID module in the manner described herein. An example of a dedicated RFID scanner suitable for usage in the below-described process is the INTERMEC-brand reader commercially marketed by Honeywell Scanning and Mobility. In certain embodiments, the range of RFID antenna 52 may be intentionally limited to a relatively small radius (e.g., on the order of 1-2 meters) to reduce the likelihood of inadvertent reception by a passenger's mobile phone or other unauthorized device.

When receiving an interrogation signal from RF scanner 54, RFID module 28 returns an RF reply signal 56 containing the health summary data stored in RFID memory 50, along with header information identifying the particular LRU or LRUs to which the health summary data pertains. The identifying information can include, for example, the serial number, part number, or manufacture date of the monitored LRU (e.g., SAV 12 or ATS 14) and/or LRU health node 10 itself. In preferred embodiments, RFID module 28 is a passive device, which does not require a battery or other power source to generate the reply signal. Instead, the interrogation signal generated by RFID scanner 54 is leveraged to energize RFID antenna 52 and obtain sufficient energy to temporarily power RFID module 28 to provide the reply signal containing the health summary information. RFID module 28 and, more generally, LRU health node 10 can consequently transmit the health summary data to RFID scanner 54 without requiring full power-up of either health node 10 or GTE 18. This results in a significant reduction in the time, cost, and complexity involved in determining LRU health are compared to a conventionally-performed routine maintenance procedure involving start-up of the aircraft engine. Furthermore, as the file size of the health summary data will typically be relatively small (e.g., on the order of a few megabits), RFID scanner 54 can receive the health summary data from each health node in a relatively abbreviated time period on the order of, for example, a few seconds or less. As previously noted, LRU health node 10 can also store other data in RFID module 28 that may be useful for maintenance purposes. This other information can include, for example, an assembly parts list for each LRU including assembly part numbers, serial numbers, nameplate data, and maintenance history data. This additional data also be transmitted to RFID scanner 54 along with the health summary data when RFID module 28 is passively interrogated to assist in depot inventory management and to help speed ordering of replacement spare parts to further decrease the likelihood of undesired delays and cancellations.

When health node controller 10 writes data in memories 30 and 50, health node controller 26 or, more generally, LRU health node 10 can be described as operating in an active recording mode. In embodiments wherein power source 24 includes an energy harvesting device, but lacks a power storage device, health node controller 26 may operate in the active recording mode only when the energy harvesting device generates power during LRU operation; or may operate in the active recording mode only when the energy harvesting device generates power and a predetermined trigger event occurs, as described above. In alternative embodiments wherein power source 24 includes a battery or another energy storage device, health node controller 10 may further be operable in a quiescent or power conservation mode during which controller 10 and possibly other components of node 10 are placed in a low power state to slow drainage of the energy storage device. In this case, health node controller 10 may switch from the active recording mode to the power conservation mode when, for example, the LRU becomes inactive or after elapse of a predetermined time period subsequent to a trigger event.

After receiving the health summary data from RFID module 28, RFID scanner 54 utilizes the newly-received health summary data to determine a maintenance action pertaining the LRU or LRUs monitored by LRU health node 10, such as SAV 12 and/or ATS 14 shown in FIG. 1. RFID scanner 54 can determine the maintenance action as a function of the health summary data by, for example, utilizing a look-up table stored in the memory of scanner 54. Alternatively, RFID scanner 54 can forward the health summary information over a digital network 58 to a remotely-located back office service or maintenance support center 60, which then utilizes the health summary data to determine an appropriate maintenance action for each LRU monitored by LRU heath node 10. Digital network 58 can be any network over which one or more adaptive streams can be received including, but not limited to, an open Content Delivery Network (CDN), the Internet, or any other digital network based upon Transmission Control Protocol (TCP)/Internet Protocol (IP) or other conventional protocols. Network 58 as illustrated in FIG. 1, then, is intended to broadly encompass any digital communications network(s), systems, or architectures for transmitting data between scanner 54 and maintenance support center 60. Maintenance support center 60 can likewise determine the appropriate maintenance action based upon the received health summary information utilizing a look-up table or formula. After determining the appropriate maintenance action, support center 60 may then transmit this information through digital network to scanner 54 for presentation to maintenance personnel, as described more fully below.

Possible maintenance actions, as determined utilizing the above-described process, can include allowing the LRU to pass inspection without additional measures; allowing the LRU to pass inspection, while indicating that the LRU should be flagged for re-inspection at a future date; and advising LRU replacement. The maintenance actions are preferably displayed on a screen 62 of the RFID scanner 54 as top-level read-outs to provide the technician or maintenance personnel with an intuitive indicator of the appropriate action to take for each LRU. Color coded symbology or icons may be utilized for this purpose. For example, as indicated in FIG. 1, a green circle can be utilized to indicate that a given LRU is in good health; a yellow circle can be utilized to indicate that a given LRU is in acceptable health, but should continue to be monitored; and a red octagon can be utilized to indicate that replacement of the LRU is warranted. Additional information can also be presented on RFID scanner display 62, as desired, such as an estimation of remaining service life for each LRU and/or a warning message if any LRU has been flagged for recall by the manufacturer.

In the event of LRU replacement, it may be desirable to retrieve the time-phased sensor data from mass storage memory 30 for failure analysis. In this case, mass storage memory 30 can be accessed utilizing physical maintenance interface 32. Additionally, it may be desirable to render mass storage memory 30 inaccessible through RFID module 28 for security purposes. If desired, maintenance interface 32 can be directly connected to mass storage memory 30. Alternatively, as indicated in FIG. 1 by communication lines 63, maintenance interface 32 can be coupled to mass storage memory 30 through health node controller 26, in which case controller 26 may require a password or security key prior to providing access to memory 30 and the time-phased sensor data stored therein. In further embodiments, the time-phased sensor data can also be transmitted over data link 51 to engine controller 20 for storage in a memory module associated therewith. Additionally or alternatively, LRU health node 10 may also transmit data to an aircraft Wireless Server Unit (WSU), an engine Wireless Control Unit (WCU), or other device included within the wirelessly-connected aircraft architecture (not shown). In still further embodiments, health node controller 26 can be configured to send engine controller 20 or another aircraft system (e.g., an Aircraft Communications Addressing and Reporting System or "ACARS") a fault message to schedule soft-time when a predetermined threshold associated within the LRU or LRUs monitored by health node 10 is reached.

Figure 4:
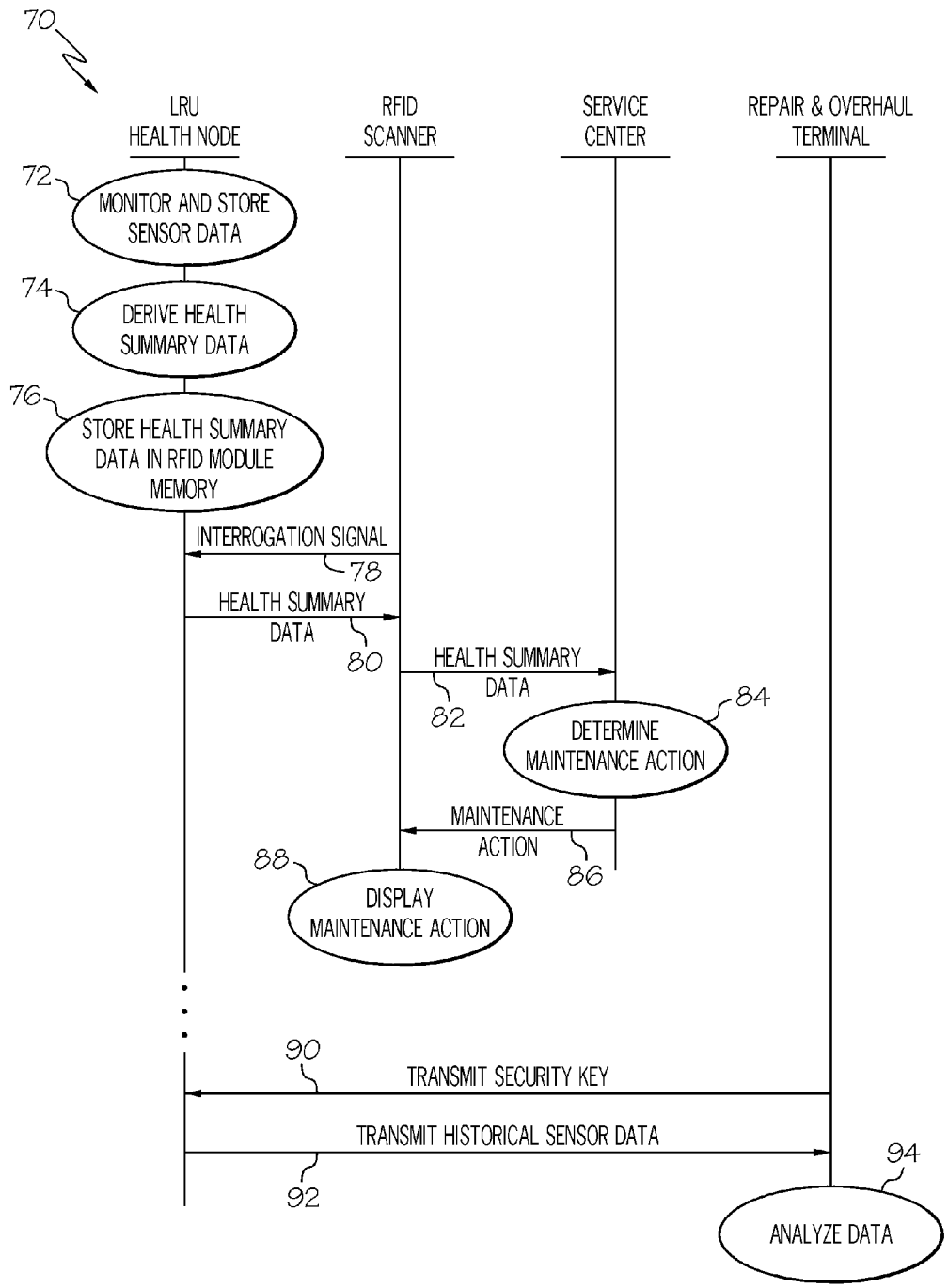
FIG. 4 is a message flow diaphragm illustrating an exemplary process for determining LRU maintenance actions utilizing a Radio frequency Identification (RFID) scanner and a LRU health node, such as the LRU health node shown in FIGS. 1-3.

FIG. 4 is a message flow diaphragm illustrating an exemplary process 70 that may be carried-out to determine the appropriate maintenance action for one or more LRUs. To initiate process 70, an LRU health node (e.g., LRU health node 10 shown in FIGS. 1-3) monitors and stores sensor data pertaining to one or more LRUs, such as SAV 12 and ATS 14 shown in FIG. 1 (FUNCTION 72). As previously described, the LRU health node devices health summary data from the time-phased primary sensor data (FUNCTION 74) and stores the health summary data in an RFID-readable memory, such as RFID memory 50 shown in FIG. 1 (FUNCTION 76). At a later juncture, such as during routine maintenance of GTE 18 (FIG. 1) or during an unplanned maintenance event, an RFID scanner (e.g., scanner 54 shown in FIG. 1) is used to transmit an interrogation signal to the LRU health node (FUNCTION 78). In response to receipt of the interrogation signal, the LRU health node provides a reply signal including the health summary data along with information identifying the LRU or LRUs to which the summary data pertains (FUNCTION 80). In preferred embodiments, the RFID scanner then forwards this information over a digital network (e.g., network 58 shown in FIG. 1) to a remotely-located maintenance support center (FUCNTION 82) as part of a larger web-service or cloud-based service. The maintenance support center then determines the appropriate maintenance action for the LRU or LRUs at issue (FUNCTION 84) and transmits this information back to the RFID scanner over the digital network (FUNCTION 86). The RFID scanner displays the maintenance action on its screen for viewing by maintenance personnel (FUNCTION 88). Additionally, in instances wherein it is desired to extract the time-phased sensor data from the LRU health node, a security key can be transmitted to the health node utilizing, for example, maintenance interface 32 shown in FIG. 1 (FUNCTION 90). Upon verification of the security key, the LRU health node transmit the time-phased sensor data to a R&O terminal (FUNCTION 92), such as laptop or desktop computer, for subsequent analysis (FUNCTION 94).

The foregoing has thus provided embodiments of LRU health nodes, which can effectively add intelligence or awareness to the LRU for prognostic and health management purposes. The health nodes can be utilized in conjunction with various different types of LRUs including, but not limited to, SAVs and ATSs. As described above, embodiments of the LRU health node are advantageously produced to have a tiered memory architecture including: (i) a mass storage memory in which time-phased sensor data is stored, and (ii) an RFID memory in which health summary data is stored. In preferred embodiments, the RFID memory can be accessed utilizing an RFID scanner in a passive manner. Maintenance personnel can thus utilize an RFID scanner to quickly interrogate the LRUs installed on a particular GTE without requiring engine start. The RFID module can thus be rapidly scanned to allow a quick and accurate estimation of LRU health during an unplanned maintenance event, during routine maintenance, or under other circumstances.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A Line Replaceable Unit (LRU) health node, comprising:
    a passive Radio Frequency identification (RFID) module, comprising:
        an RFID memory; and
        an RFID antenna coupled to the RFID memory and enabling wireless access thereto when energized by an interrogation signal;
    a mass storage memory;
    a sensor configured to monitor an operational parameter of an LRU and generate a corresponding output signal; and
    a health node controller operably coupled to the passive RFID module, to the mass storage memory, and to the sensor, the health node controller operable in an active recording mode in which the health node controller: (i) records the output signal generated by the sensor in the mass storage memory as time-phased sensor data, (ii) derives health summary data from the time-phased sensor data, and (iii) stores the health summary data in the RFID memory.

2. The LRU health node of claim 1 wherein the LRU health node further comprises an energy harvesting mechanism coupled to the health node controller and configured to generate power during operation of the LRU.

3. The LRU health node of claim 2 wherein the LRU includes a rotating component, and wherein energy harvesting mechanism is configured to generate power from rotation of the rotating component.

4. The LRU health node of claim 1 further comprising an energy storage device coupled to the health node controller, and wherein the health node controller is further operable in a power conservation mode in which less power is drawn from the energy storage device than in the active recording mode.

5. The LRU health node of claim 4 wherein the LRU health node controller is configured to switch from the active recording mode to the power conservation mode when the LRU becomes inactive.

6. The LRU health node of claim 1 wherein RFID memory further stores at least one of the group consisting of an assembly parts list for the LRU, a serial number list for the LRU, nameplate data for the LRU, and maintenance history data for the LRU.

7. The LRU health node of claim 1 further comprising a physical maintenance interface coupled to the mass storage memory and enabling access to the time-phased sensor data.

8. The LRU health node of claim 7 wherein the physical maintenance interface comprises a bus-connected port manually accessible from the exterior of the LRU health node.

9. The LRU health node of claim 1 wherein the mass storage memory is inaccessible via the RFID module.

10. The LRU health node of claim 1 wherein the LRU receives command signals from an engine controller, wherein the health node controller further comprises an input operably coupled to the engine controller when the LRU health node is installed on the LRU, and wherein the health summary data derived by the health node controller comprises the time between issuance of a command signal and a response by the LRU.

11. The LRU health node of claim 1 wherein the LRU is a Starter Air Valve (SAV) having a valve rotatable between fully open and closed positions, wherein the sensor is configured to monitor the rotational position of the valve, and wherein the health node controller is configured to store the rotational position of the valve in the mass storage memory as time-phased data.

12. The LRU health node of claim 11 wherein SAV further comprises a valve shaft fixedly coupled to the valve, and wherein the sensor comprises a Rotary Variable Differential Transformer (RVDT) configured to monitor the rotational displacement of the valve shaft.

13. The LRU health node of claim 1 wherein the LRU is an Air Turbine Starter (ATS) having an air turbine, wherein the sensor is configured to monitor the rotational speed of the air turbine, and wherein the health node controller is configured to record the time-phased rotational speed of the air turbine in the mass storage memory.

14. The LRU health node of claim 1 wherein the controller is configured to record the output signal generated by the sensor in the mass storage memory as time-phased sensor data in response to detection of a trigger event.

15. An Line Replace Unit (LRU) health node system, comprising:
    a first LRU containing a rotating component; and
    an LRU health node mounted to the first LRU, the LRU health node comprising:
        a Radio Frequency identification (RFID) module containing an RFID memory;
        a first sensor configured to monitor an operational parameter pertaining to the rotating component and generate a corresponding output signal; and a health node controller operably coupled to the RFID module and to the first sensor, the health node controller configured to derive health summary data from the output signal generated by the sensor and store the health summary data in the RFID memory for subsequent access utilizing a wireless RFID scanner.

16. The LRU health node system of claim 15 wherein the first LRU comprises a Starter Air Valve (SAV), wherein the rotating component comprises a rotatable valve, and wherein the first sensor is configured to monitor the rotational position of the rotating valve.

17. The LRU health node system of claim 16 further comprising:
   an Air Turbine Starter (ATS) containing an air turbine; and
   a second sensor operably coupled to the health node controller and configured to monitor the rotational speed of the air turbine.

18. A method for determining maintenance actions relating to a Line Replaceable Unit (LRU), comprising:
   transmitting an interrogation signal from a Radiofrequency Identification (RFID) scanner to an RFID module included within an LRU health node installed on the LRU;
   in response to transmission of the interrogation signal, receiving at the RFID scanner health summary data stored in an RFID memory of the RFID module and pertaining to the LRU;
   determining at the RFID scanner a maintenance action as a function of the health summary data; and
   displaying the maintenance action on a screen of the RFID scanner.

19. The method of claim 18 wherein determining the maintenance action comprises utilizing a look-up table stored in a memory of the RFID scanner to determine the maintenance action as a function of the health summary data.

20. The method of claim 18 wherein determining the maintenance action comprises:
   transmitting the health summary data over a network to a maintenance support center; and
   in response to transmission of the health summary data, receiving the maintenance action from the maintenance support center.

* * * * *